Jan. 21, 1930.   W. WISHART   1,744,090
MOUNTING FOR REFRIGERATING APPARATUS
Filed Dec. 10, 1926   2 Sheets-Sheet 1
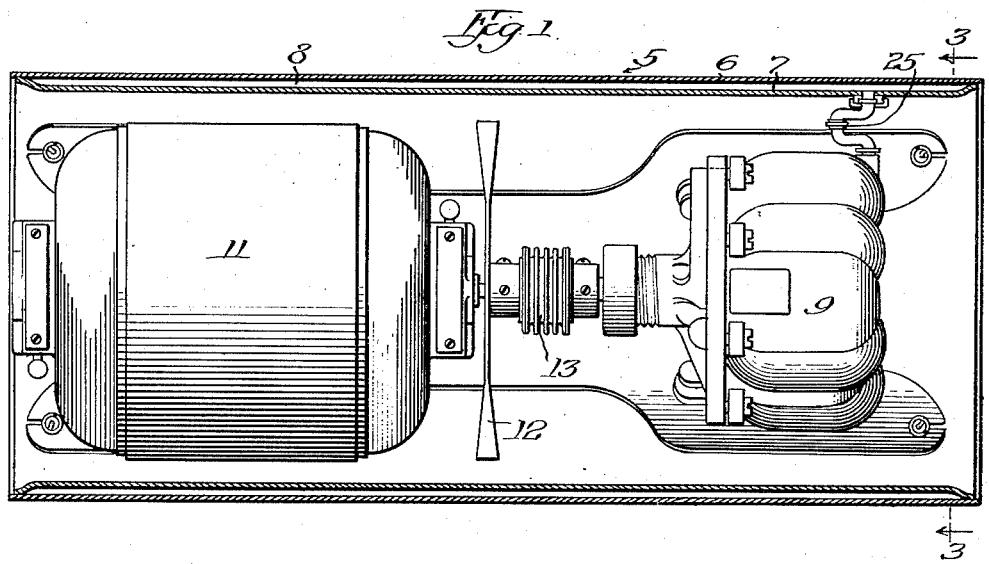
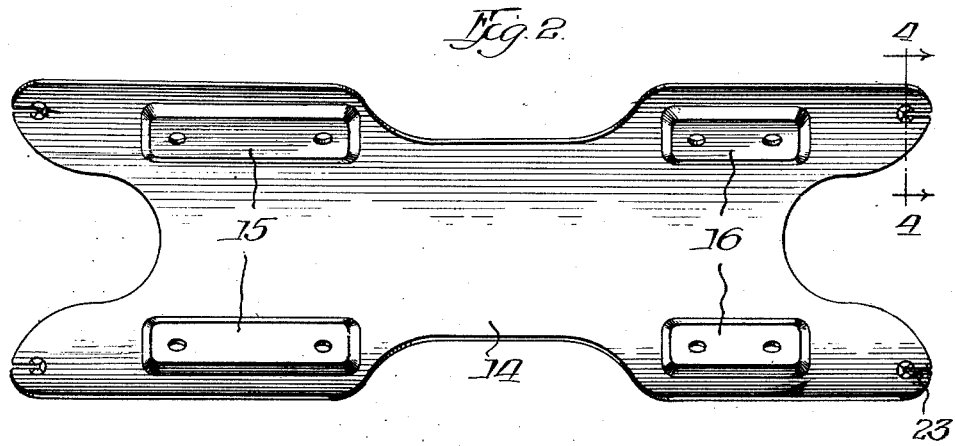

Jan. 21, 1930.   W. WISHART   1,744,090
MOUNTING FOR REFRIGERATING APPARATUS
Filed Dec. 10, 1926   2 Sheets-Sheet 2
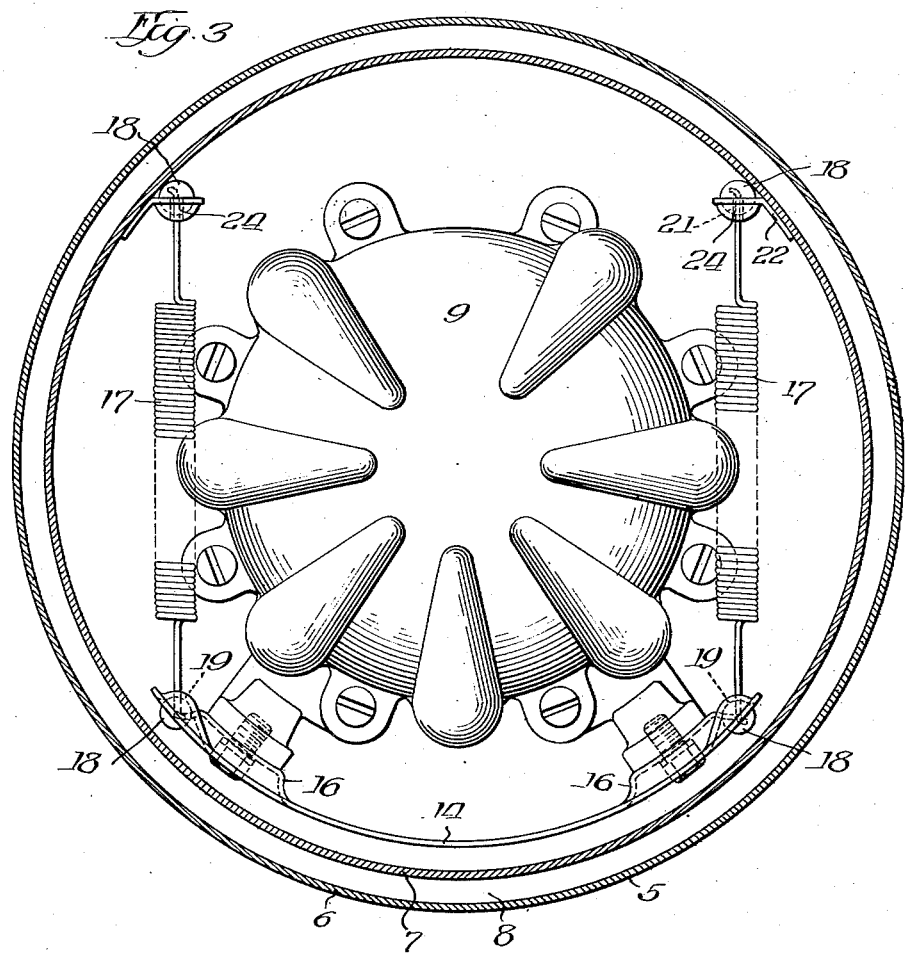
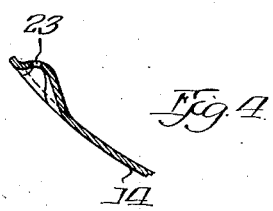

Patented Jan. 21, 1930

1,744,090

UNITED STATES PATENT OFFICE

WILLIAM WISHART, OF BELOIT, WISCONSIN, ASSIGNOR TO NATIONAL REFRIGERATION CORPORATION, OF BELOIT, WISCONSIN, A CORPORATION OF DELAWARE

MOUNTING FOR REFRIGERATING APPARATUS

Application filed December 10, 1926. Serial No. 153,802.

This invention relates to refrigerating units of the type illustrated and described in connection with the co-pending application of French E. Dennison for United States Letters Patent, Serial No. 123,991, filed July 21, 1926, and aims to provide an improved unit of this type.

Units of the above type are usually equipped with a compressor and driving motor which set up considerable vibration. This vibration is objectionable not only because the units are often used under circumstances where such vibration would set up a disturbance in the vicinity of the unit but because of the humming noise caused by the vibration. It is accordingly an object of this invention to eliminate such vibration so far as possible.

It is also an object of this invention to provide a supporting means for the moving parts which will reduce the vibration to a minimum and to provide a support which will permit the ready removal of such parts from the shell for inspection, cleaning, renewal or repair.

Other and further objects of this invention will be apparent as the same becomes better understood from an examination of the specification and claims in connection with the accompanying drawings wherein, Fig. 1 is a horizontal section taken through the central plane of the unit and showing parts thereof in elevation;

Fig. 2 is the base plate for the motor and compressor;

Fig. 3 is a section taken at the line 3—3 of Fig. 1; and

Fig. 4 is a detail fragmentary section taken at the line 4—4 of Fig. 2.

Referring to the drawings more particularly, the unit illustrated therein includes a cylinder 5, the walls of which are double and include an outer cylinder 6 and an inner cylinder 7. The ends of the cylinder 7 are sealed with the corresponding ends respectively of the cylinder 6 affording a thin cylindrical condensing chamber 8.

Within the cylinder 5, there is mounted a rotary compressor 9 and a driving motor 11 therefor, both of which cooperate with said cylinder 5 substantially as represented in said co-pending application. A rotary fan 12 is mounted on the shaft of the motor 11 for causing air to circulate through the cylinder 5 to cool the compressor, motor, and condenser. The motor 11 is mounted with its shaft in alignment with that of the compressor 9 and is operatively connected thereto by a flexible connection 13 which joins the two shafts. The motor 11 and compressor 9 are mounted upon the longitudinal plate or mount 14 which is arcuate in cross section, the curvature thereof being concentric with the cylinder 5. The plate 14 is preferably provided with raised shoulders 15 and 16 to which are bolted the bases of the motor and compressor respectively.

The plate 14 carrying the motor 11 and compressor 9 is resiliently and flexibly supported within the shell of the condenser in a manner which prevents any sudden jarring of the unit from causing injury to said shell and so as to absorb vibrations of the motor and compressor. Such a flexible and resilient support is provided by four helical springs 17 which are connected to the four corners of the plate 14 and suspended above said plate within the cylinder 5. Each end of each spring 17 is secured to a ball 18, the lower ball resting in a semi-spherical bearing 19 formed integrally in the corresponding corner of the plate 14 by striking the latter upwardly to form the said bearing. The upper ball 18 of each spring 17 rests in a similar bearing 21 formed integrally with an angle member 22 welded or otherwise suitably secured to the cylinder 5. One of such angles 22 is secured in said cylinder above each of the four corners of the plate 14 so that each spring 17 will normally hang vertically. The plate 14 is provided with four slots 23, one extending into the center of each of the bearings 19 from the outside edge of said plate. The purpose of the slot 23 is to receive the portion of the spring 17 immediately adjacent the lower ball 18 so that the latter may be readily removed from its respective bearing 19 to release each spring 17 when it is desired to remove the plate 14 and parts carried thereby for inspection, cleaning, renewal or repair. A similar slot 24 may be provided in each of the angles 22 extending from the edge thereof to the center of the bearing 21 to facilitate assembly.

The discharge from the compressor 9 to the condensing chamber 8 may be provided for by a conduit having a flexible coupling 25.

I am aware that many changes may be made and many details of construction varied throughout a wide range without departing from the principles of this invention and I do not wish to be limited to the details shown and described.

I claim:

1. In a device of the class described, the combination of a compressor and driving means therefor, a condenser adapted to receive said compressor and driving means, and means for yieldingly suspending said compressor and driving means from said condenser.

2. In a device of the class described, the combination of a compressor and driving means therefor, a condenser adapted to receive said compressor and driving means, a mount for said compressor and driving means, and a plurality of springs, each spring having its upper end flexibly connected to said condenser and its lower end flexibly and detachably connected to said mount.

3. The combination with a cylindrical condenser, of a supporting member, springs yieldably and detachably supporting said member from and within said condenser, and a compresser and driving means therefor carried by said supporting member.

4. In a device of the class described, the combination of a compressor and driving means therefor, a mount for said compressor and driving means, a plurality of springs, a spherical member attached to each end of each spring, a support provided with bearing means adapted to cooperate with the spherical member on one end of each of the springs and bearing means on said mount adapted to cooperate with the spherical members on the other ends of the springs whereby the mount is suspended by the springs.

5. In a device of the character described, the combination of a compressor and driving means therefor, a mount for said compressor and driving means, a condenser adapted to receive said mount, a plurality of springs each having a spherical member at its opposite ends, bearing means attached to said condenser and cooperating with the spherical member on one end of each of the springs and bearing means on the mount cooperating with the spherical members on the other ends of the springs whereby the mount is suspended by the springs within the condenser.

6. In a device of the class described, the combination of a compressor and driving means therefor, a mount for said compressor and driving means, a plurality of supporting members each having a spherical member at its opposite ends, a condenser adapted to receive said mount and provided with bearing means cooperating with the spherical member at one end of each of said supporting members, and bearing means on said mount adapted to cooperate with the spherical members on the other ends of said supporting members whereby the mount is suspended by the supporting members within the condenser.

In witness of the foregoing I affix my signature.

WILLIAM WISHART.